UNITED STATES PATENT OFFICE.

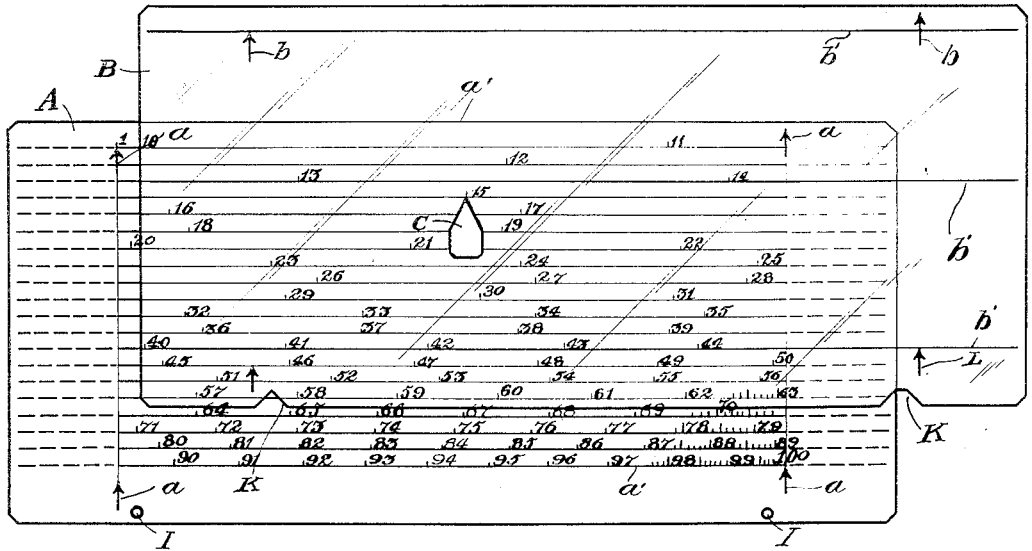

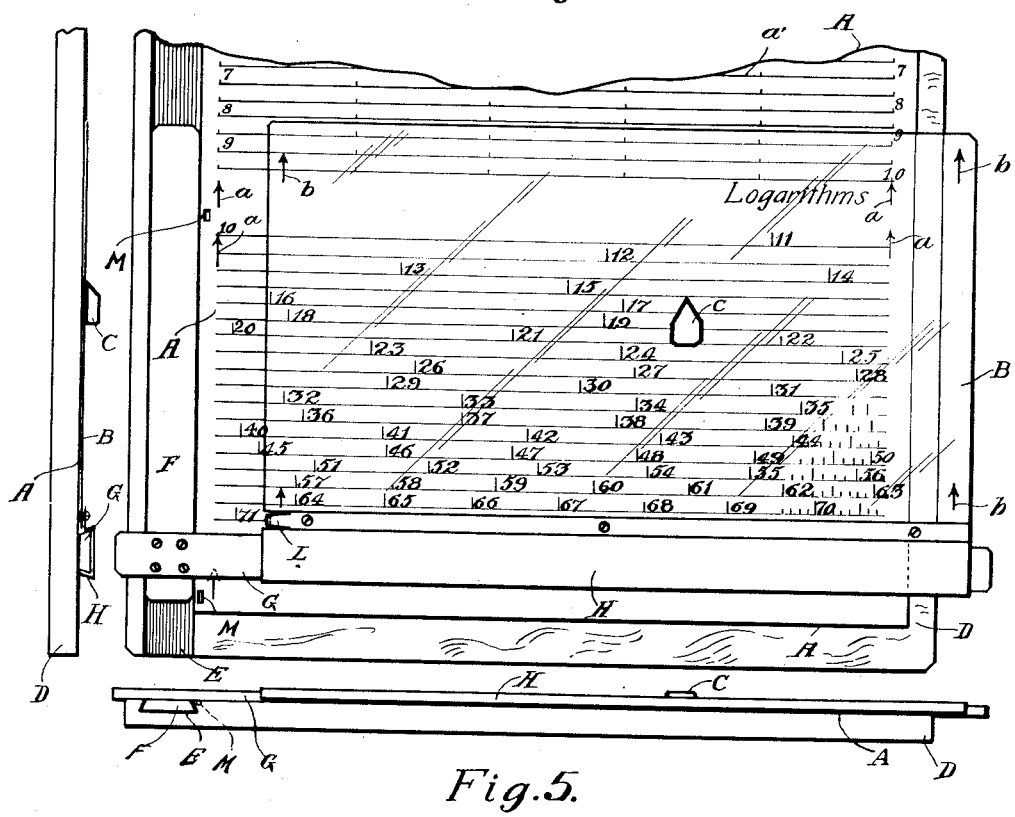

HAROLD ALLEN THOMAS, OF TERRE HAUTE, INDIANA.

COMPUTING DEVICE.

1,040,592.  Specification of Letters Patent.  Patented Oct. 8, 1912.

Application filed December 23, 1911. Serial No. 667,542.

*To all whom it may concern:*

Be it known that I, HAROLD A. THOMAS, a citizen of the United States, residing at Terre Haute, in the county of Vigo and State of Indiana, have invented a new and useful Computing Device, of which the following is a specification.

This invention relates to logarithmic computing devices, and is founded on the principle of the ordinary slide rule.

It is the object of my invention to produce a computing device which will be many times more accurate than the ordinary slide rule without a corresponding increase in length or bulk; which will be simple in operation, cheap in manufacture, and compact in construction; which will have all parts of its graduated scale at all times in view of the computer, thus increasing the operating speed of the instrument and lessening the strain upon the eyes; which will allow the easy and convenient use of auxiliary scales, such as squares, cubes, roots, trigonometric functions, logarithms, engineering and commercial quantities, decimal-pointing, etc., in connection with the ordinary numerical logarithmic scale and with one another; and which will simplify the arrangement of scales and pointers, thus reducing the chance of making mistakes. In attaining these objects there is provided a suitable member carrying a logarithmic or other scale, equal parts of which are preferably arranged upon a number of equally spaced parallel lines; a superposed transparent member which is relatively movable with respect to the first member and is provided with suitable means for maintaining parallelism and suitable relatively fixed index points or marks; and a pointer which may be adjusted to any position on the transparent member and is moved with the latter upon movement thereof. There may be a number of scale-bearing members, provided with different scales, and these different scale-bearing members may be used in connection with the same transparent member and pointer during the same or different calculations. Both the scale-bearing members and the transparent members are preferably in the form of thin sheets, the scale-bearing sheet being suitably backed to give it rigidity, if desired or necessary.

The various novel feature of my invention will appear from the description and drawings, and will be more particularly pointed out in the claims.

Figure 1 is a plan view of one form of device embodying my invention, the scale-bearing sheet being provided with a simple numerical logarithmic scale; Fig. 2 is a view showing fragments of scale-bearing sheets provided with other forms of scales; Fig. 3 is a view showing my device equipped with an automatic parallel motion device and provided with two scales arranged for joint use; and Figs. 4 and 5 are edge views of the arrangement shown in Fig. 3. On the various scales only the coarser divisions are indicated, in order to avoid confusion in the drawings.

The scale-bearing member or sheet A carries a suitable scale which is divided into a number of equal parts arranged on successive parallel lines $a'$. This scale may be a simple numerical logarithmic scale, such as shown in Fig. 1 or in the lower part of Fig. 3, or any other suitable scale; fragments of several scales are shown in Fig. 2 and in the upper part of Fig. 3. In addition to the scale, the sheet A is preferably provided with a number of arrows $a$, or other index marks, preferably four in number, for indicating the unity position of the device. The sheet A may be made of any suitable material; paper, celluloid, and enameled sheet metal, mounted, if desired, on any suitable backing, such as wood or fiber, are well adapted for the purpose.

Superposed upon the sheet A is a transparent member or sheet B, which may conveniently be made of celluloid, glass or other transparent material. The sheet B carries no scale, but is provided with a number of arrows $b$ or other index marks, also four in number, which are arranged in the same relation to each other as are the arrows $a$ on the sheet A. The arrows $b$ are superposed upon the corresponding arrows $a$ when the device is in unity position. The two arrows at the top of each sheet, and also the two arrows at the bottom of each sheet, are spaced apart vertically a distance equal to that between successive lines $a'$ on the sheet A, and horizontally a distance equal to the scale-bearing length of a line $a'$ on the sheet A, so that they are virtually one point or would indicate the same reading on sheet A but on successive lines. Superposed upon the sheet B is a movable pointer C. This also may be made of any suitable material, and I have found that rubber is quite desirable, as especially when slightly moistened, it will adhere to the sheet B sufficiently to prevent it from becoming displaced by accidental jarring. This pointer may be placed anywhere on the sheet B, as required by the calculation.

Suitable means is provided for maintaining parallelism between the sheets A and B. In the simplest form this means may comprise merely two or more lines $b'$ extending lengthwise of the sheet B and coinciding with lines $a'$ on the sheet A when the two sheets are parallel. In order to render this paralleling device accurate when the sheets overlap but a little, as at one corner, the sheets are preferably made somewhat longer than the scale-bearing parts of lines $a'$, and such lines, as well as the lines $b'$, are extended beyond the ends of their scale-bearing parts; this gives a greater length of line for coincidence, and thus renders more accurate the obtaining of parallelism, especially when the scales overlap but slightly. Instead of this simple form of paralleling means, there may be provided a suitable mechanical parallel motion device, one form of which is shown in Fig. 3. Here one or more scale-bearing sheets A, having different scales, are mounted on a board or table D, along one side of which is a dove-tailed groove E in which is a slide F carrying a relatively fixed transverse dove-tailed slide bar G on which is mounted a slide H, to which is fastened one edge of the transparent sheet B. This form of parallel motion device is merely illustrative.

If desired, suitable means may be provided, in addition to the arrows $a$ and $b$, for bringing the sheet B readily to unity position. In the form shown in Fig. 1, this is accomplished by slight projections I from the lower edge of the sheet A in proper position to engage notches K in the lower edge of the sheet B when the device is in unity position or the index arrows $b$ are directly superposed upon and coincident with the index arrows $a$. By means of these pins and notches the sheet B may be brought to unity position without the necessity for visual adjustment. The projections I are preferably so slight that the sheet B may be superposed on them without being raised sufficiently to produce liability of error in reading on account of parallax. In the form shown in Fig. 3, the same result is accomplished by providing the slide H with a spring catch L which springs into a slight depression M in the board D when the sheet B is in unity position.

The use of the device is as follows:

*Multiplication.*—Place the transparent sheet B in unity position, so that its arrows $b$ coincide with the arrows $a$. Place the movable pointer C on the sheet B so that it is directly over the multiplier on the scale on sheet A. Then move the transparent sheet so that the proper one of its index arrows is directly over the multiplicand, the proper arrow being the one which will come over the multiplicand with the pointer C over the scale on sheet A. The pointer C now indicates the product.

*Division.*—Place the transparent sheet B in unity position, set the pointer C directly over the divisor, as indicated on the scale on sheet A, and move the transparent sheet until the pointer C is over the dividend; whereupon that one of the arrows $b$ which is over the scale on sheet A indicates the quotient.

*Proportion—$w:x::y:z$.*—Set an arrow of the transparent sheet B at $w$ on the scale on sheet A, set the pointer C at $x$ on sheet A, move the transparent sheet until one of its arrows is at $y$ on the scale on sheet A; the pointer C will then indicate $z$.

*Continued multiplication and division—$\frac{uvw}{xyz}$.*—This operation may be performed by breaking the expression up into two or more groups, such as $$\frac{u}{xy}$$

and—

$$\frac{vw}{z},$$

solving each group by the multiplication and division methods indicated above, and combining the groups by the multiplication or division method indicated above.

*Auxiliary scales.*—Suppose it is desired to multiply numbers which are given on different scales, as, for instance, the sine of an angle by a number; the transparent sheet B is set on the auxiliary sine and cosine scale at unity position, the pointer C is set at the proper angle, as indicated on the scale, the transparent sheet B is moved to the simple numerical logarithmic scale, indicated in Fig. 1, and one of its arrows set at the proper multiplying number, whereupon the pointer C indicates the result.

The various operations, on the various combinations of scales, will readily suggest themselves.

The construction of logarithmic scales and the theory of their use are so well understood that no explanation thereof is needed here. As is the case with practically all slide rules, my computing device gives only the order of the figures in the desired answer, leaving the decimal point to be placed mentally, according to which of the arrows $b$ is used in obtaining the result. The various auxiliary scales may be printed on separate sheets, or one or more of them may be printed on the same sheet with the simple numerical logarithmic scale of Fig. 1. The auxiliary scales are exactly similar to the main scale in the length and number of lines, the difference being entirely in the scale divisions and markings.

If the sheets A and B have different coefficients of expansion on changes in temperature, humidity, etc., it is desirable to make the arrows $b$, or some of them, readily movable relatively to the sheet B. This may readily be done by marking them in pencil, or even ink if the sheet B is of celluloid or other impervious material, and changing them from time to time as conditions require.

With my computing device it is possible to determine the fifth decimal place with ease and certainty and to do so with a device of convenient size. For instance, if the scale on sheet A is made with the lines $a'$ on the scale-bearing parts thereof 25 inches long and there are 144 lines spaced ⅛ of an inch apart, thus requiring a total space of 18 inches, there is obtained a logarithmic scale whose total length is 300 feet. This represents an accuracy of about 360 times that of the common slide rule now in ordinary use and of about ten times that of the most accurate computing device of comparable size heretofore known. However, the size of sheets A and B and the spacing of the lines may be anything desired, the above being given merely by way of illustration.

Many modifications may be made in the precise form and arrangement of the computing device, and I aim to cover all modifications which do not involve a departure from the spirit and scope of my invention as set forth in the following claims.

What I claim as new is:

1. A computing device comprising two superposed sheets, the lower one being provided with a scale equal parts of which are arranged on parallel lines and the upper one being transparent and provided with one or more index points and being movable relatively to the lower one both longitudinally and transversely of said parallel lines, and a pointer movable both with and independently of the transparent sheet.

2. A computing device comprising two superposed sheets movable relatively to each other, the lower one being provided with a scale and the upper one being transparent and provided with one or more index points, and a pointer carried by the transparent sheet and adjustable in position thereon.

3. A logarithmic computing device comprising a member bearing a logarithmic scale equal parts of which are placed on a plurality of parallel lines, a scaleless member movable relatively to said scale and having one or more index points which by such movement may be brought into coincidence with any point on the scale, and a pointer which may be moved relatively to said movable member but is also movable therewith.

4. A logarithmic computing device, comprising a sheet having a logarithmic scale arranged on a plurality of parallel lines of equal length, a transparent sheet provided with one or more index points and movable relatively to the first sheet both longitudinally and transversely, means whereby said two sheets may be maintained in parallelism, and a pointer which may be placed anywhere on the transparent sheet and is movable therewith.

5. A logarithmic computing device, comprising a sheet having a logarithmic scale, a transparent sheet provided with one or more index points and movable relatively to the first sheet, means whereby said two sheets may be maintained in parallelism, and a pointer which may be placed anywhere on the transparent sheet and is carried thereby.

6. A logarithmic computing device, comprising a sheet having a logarithmic scale arranged on a plurality of parallel lines of equal length, a transparent sheet provided with one or more index points and movable relatively to the first sheet both longitudinally and transversely, means whereby said two sheets may be maintained in parallelism, and a pointer which may be placed anywhere on the transparent sheet and is movable therewith, and means for bringing the transparent sheet so that its index points coincide with the unity points on the first named sheet without visual adjustment.

7. A logarithmic computing device, comprising a sheet having a logarithmic scale, a transparent sheet provided with one or more index points and movable relatively to the first sheet both longitudinally and transversely, means whereby said two sheets may be maintained in parallelism, and a pointer which may be placed anywhere on the transparent sheet and is movable therewith, and means for bringing the transparent sheet so that its index points coincide with the unity points on the first named sheet without visual adjustment.

8. A computing device comprising a member carrying a logarithmic scale, equal parts of which are arranged on a number of equally spaced parallel lines, a transparent member superposed on said scale-carrying member and movable relatively thereto both longitudinally and transversely and provided with four index points, said index points being arranged in pairs which coöperate with opposite ends of the scale, the two points of a pair being spaced so that they would make the same reading but on successive lines, and a pointer which may be adjusted to any point on the transparent member and is movable therewith.

9. A logarithmic computing device comprising a member provided with a plurality of different logarithmic scales, said scales being of the same length and being similarly divided into a number of equal parts placed on equally spaced parallel lines of equal length, a transparent member superposed upon the member carrying such scales and provided with one or more index points which may be made to coöperate with either scale, and a pointer adjustable to any position on such transparent member and movable with the latter.

10. A logarithmic computing device comprising a member provided with a plurality of different logarithmic scales, said scales being of the same length, a transparent member superposed upon the member carrying such scales and provided with one or more index points which may be made to coöperate with either scale, and a pointer adjustable to any position on such transparent member and movable with the latter.

11. A logarithmic computing device comprising a member provided with a plurality of different logarithmic scales, said scales being of the same length and being similarly divided into a number of equal parts placed on equally spaced parallel lines of equal length, a transparent member superposed upon the member carrying such scales and provided with one or more index points which may be made to coöperate with either scale, and a pointer adjustable to any position on such transparent member and movable with the latter, the relative movement between the scale-carrying member and the transparent member being such that parallelism is maintained.

12. A logarithmic computing device comprising a member provided with a plurality of different logarithmic scales, said scales being of the same length, a transparent member superposed upon the member carrying such scales and providede with one or more index points which may be made to coöperate with either scale, and a pointer adjustable to any position on such transparent member and movable with the latter, the relative movement between the scale-carrying member being such that parallelism is maintained.

13. A logarithmic computing device comprising a member provided with a plurality of different logarithmic scales, said scales being of the same length and being similarly divided into a number of equal parts placed on equally spaced parallel lines of equal length, a transparent member superposed upon the member carrying such scales and provided with one or more index points which may be made to coöperate with either scale, a pointer adjustable to any position on such transparent member and movable with the latter, and means for bringing the transparent member so that its index points coincide with the unity points on any of said scales without visual adjustment.

14. A logarithmic computing device comprising a plurality of separate members carrying different logarithmic scales, said scales being of the same length and being similarly divided into a number of equal parts placed on equally spaced parallel lines of equal length, a transparent member which may be superposed upon any of said scale carrying members and is provided with one or more index points for coöperating with any scale on said members, and a pointer adjustable to any position on such transparent member and movable with the latter.

15. A logarithmic computing device comprising a plurality of separate members carrying different logarithmic scales, said scales being of the same length, a transparent member which may be superposed upon any of said scale-carrying members and is provided with one or more index points for coöperating with any scale on said members, and a pointer adjustable to any position on such transparent members and movable with the latter.

16. A logarithmic computing device comprising a plurality of separate members carrying different logarithmic scales, said scales being of the same length and being similarly divided into a number of equal parts placed on equally spaced parallel lines of equal length, a transparent member which may be superposed upon any of said scale carrying members and is provided with one or more index points for coöperating with any scale on said members, and a pointer adjustable to any position on such transparent member and movable with the latter, said scale bearing members and said transparent members being provided with means for maintaining parallelism.

17. A logarithmic computing device comprising a plurality of separate members carrying different logarithmic scales, said scales being of the same length, a transparent member which may be superposed upon any of said scale carrying members and is provided with one or more index points for coöperating with any scale on said members, and a pointer adjustable to any position on such transparent member and movable with the latter, said scale bearing members and said transparent members being provided with means for maintaining parallelism.

18. A logarithmic computing device comprising a plurality of separate members carrying different logarithmic scales, said scales being of the same length and being similarly divided into a number of equal parts placed on equally spaced parallel lines of equal length, a transparent member which may be superposed upon any of said scale-carrying members and is provided with one or more index points for coöperating with any scale on said members, and a pointer adjustable to any position on such transparent member movable with the latter, and means for bringing the transparent member so that its index points coincide with the unity points on any of said scales without visual adjustment.

19. A computing device comprising a member carrying a logarithmic scale, equal parts of which are arranged on a number of equally spaced parallel lines, a transparent member superposed on said scale-carrying member and movable relatively thereto both longitudinally of and transversely to said parallel lines and provided with a pair of index points which are spaced so that they would make the same reading but on different lines of the scales, and a pointer carried by the transparent member and adjustable to any point thereon.

20. A computing device comprising a member carrying a logarithmic scale, equal parts of which are arranged on a number of equally spaced parallel lines, a transparent member superposed on said scale-carrying member and movable relatively thereto both longitudinally of and transversely to said parallel lines and provided with a pair of index points which are spaced apart a distance equal to one side of the triangle of which the length of one of said equal parts of the scale and the distance between successive arms of said parallel lines form the other two sides, and a pointer carried by the transparent member and adjustable to any point thereon.

21. A computing device comprising a member carrying a logarithmic scale, equal parts of which are arranged on a number of equally spaced parallel lines, a transparent member superposed on said scale-carrying member and movable relatively thereto both longitudinally of and transversely to said parallel lines and provided with a pair of index points which are spaced apart a distance equal to the distance between the end of a scale part one of said parallel lines and the beginning of the scale part on the next parallel line, and a pointer carried by the transparent member and adjustable to any point thereon.

22. A computing device comprising two superposed sheets, one of said sheets being provided with a scale equal parts of which are arranged on parallel lines and the other being provided with one or more index points, the two sheets being movable relatively to each other both longitudinally and transversely of said parallel lines and the upper sheet being transparent, and a pointer adjustable in position on the sheet provided with the index points and movable therewith relatively to the other sheet.

In witness whereof, I, have hereunto set my hand and seal at Terre Haute, Indiana, this fourteenth day of December, A. D. one thousand nine hundred and eleven.

HAROLD ALLEN THOMAS. [L. S.]

Witnesses:
C. LEO MEES,
D. W. JONES.